Nov. 29, 1960  W. A. DERR ET AL  2,962,702
REMOTE METERING
Filed Feb. 20, 1956  5 Sheets-Sheet 1
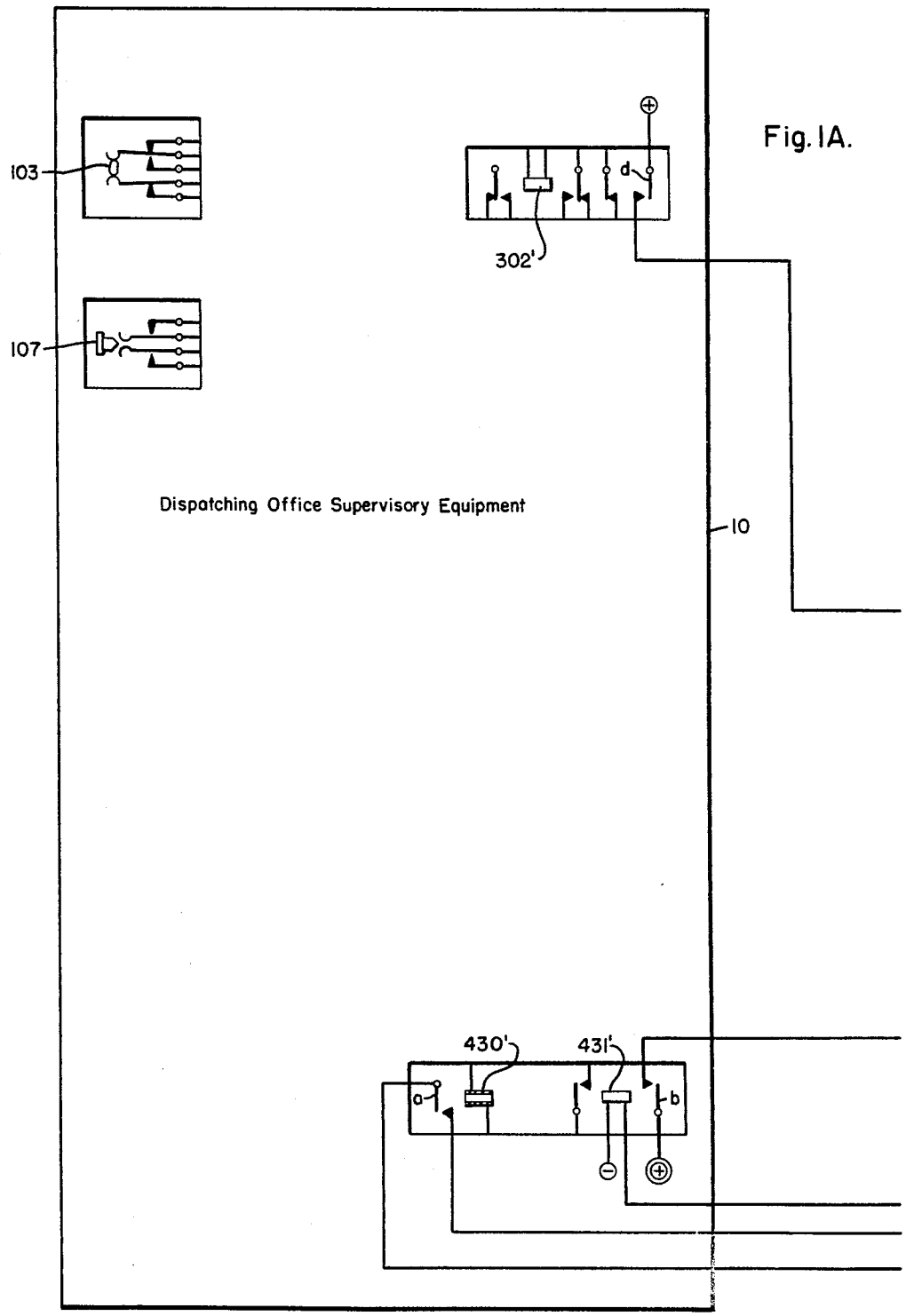
Fig. IA.

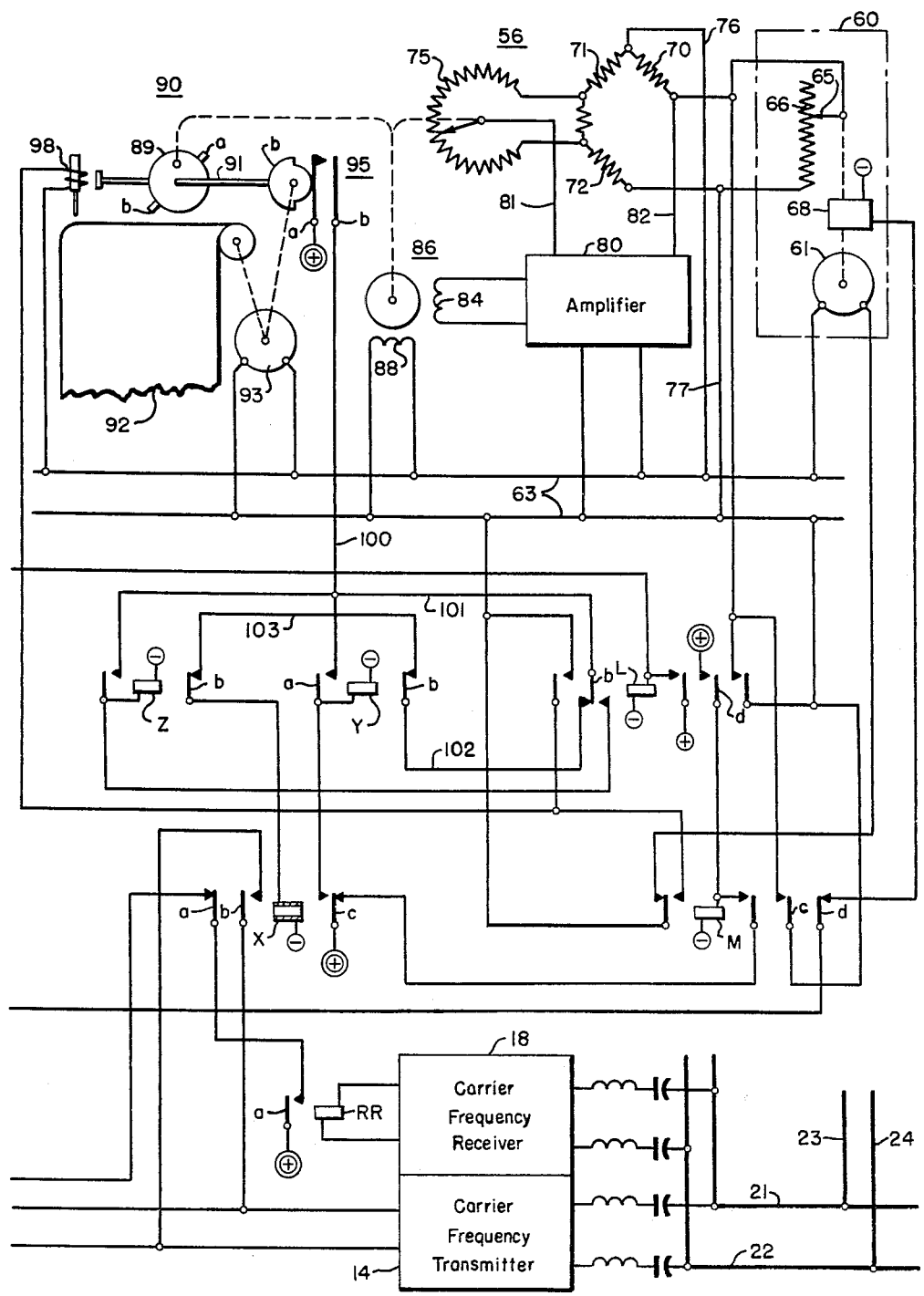

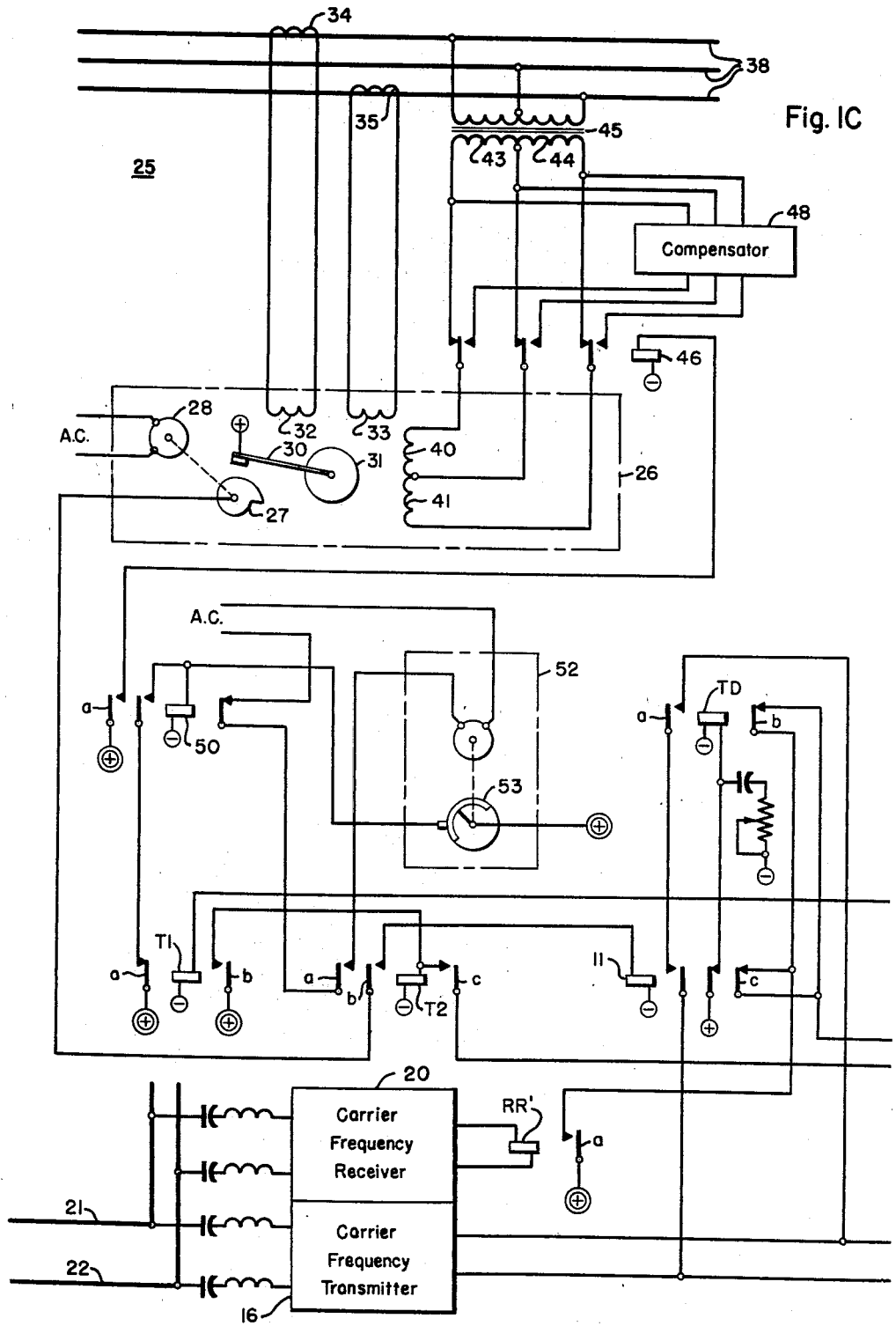

Nov. 29, 1960 W. A. DERR ET AL 2,962,702
REMOTE METERING
Filed Feb. 20, 1956 5 Sheets-Sheet 4
Fig. ID.
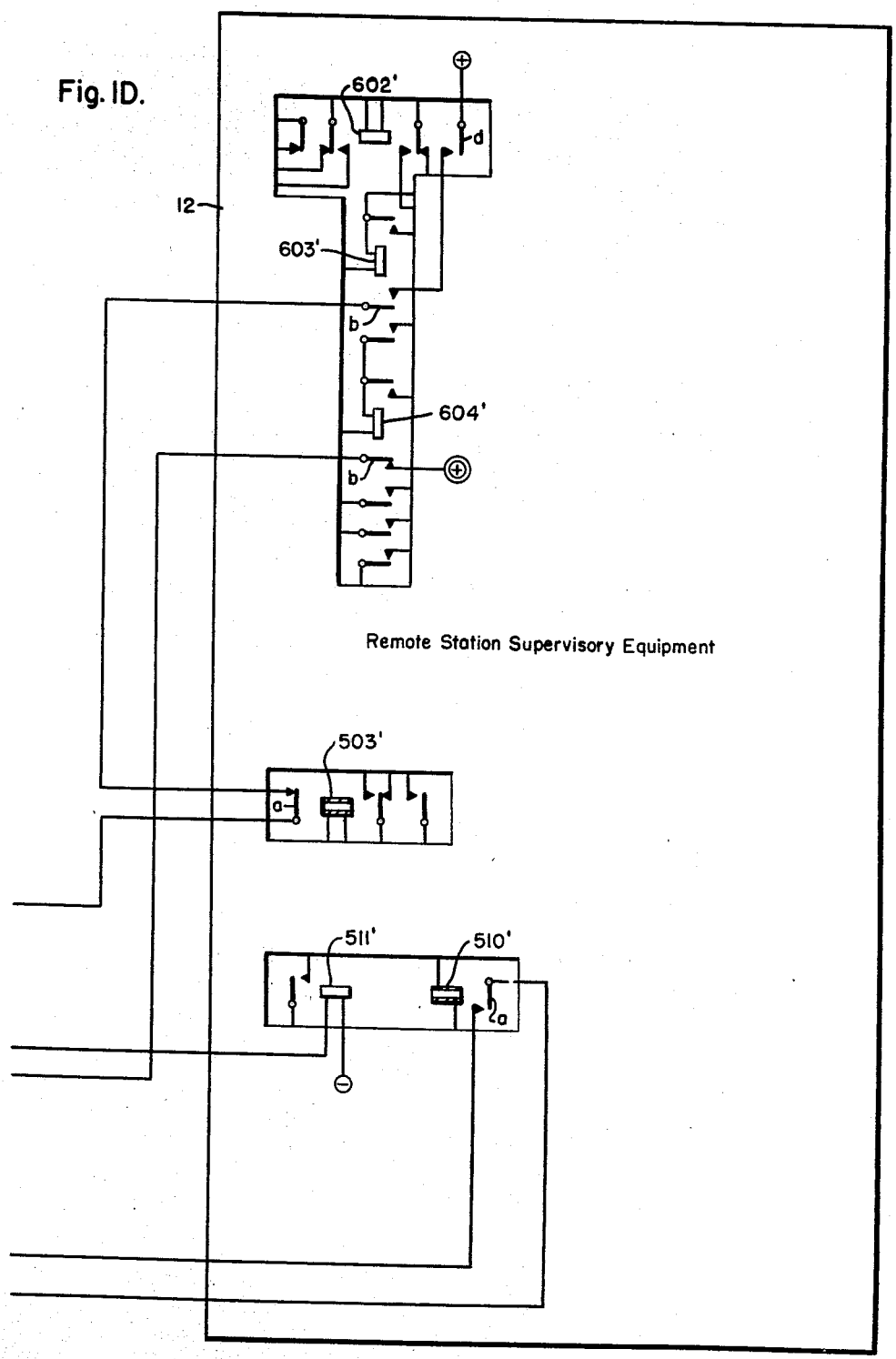
Remote Station Supervisory Equipment United States Patent Office 2,962,702
Patented Nov. 29, 1960

1

2,962,702

REMOTE METERING

Willard A. Derr, Pittsburgh, and Weldon L. Metz, Verona, Pa., assignors to Westinghouse Electric Corporation, East Pittsburgh, Pa., a corporation of Pennsylvania Filed Feb. 20, 1956, Ser. No. 566,468

4 Claims. (Cl. 340—180)

Our invention relates generally to remote metering and has reference in particular to the telemetering of a plurality of different quantities over a supervisory control signal channel or the like.

Generally stated, it is an object of our invention to provide a multiplex telemetering system that is inexpensive to install and is reliable in operation.

More specifically, it is an object of our invention to provide for continuous telemetering of a plurality of different quantities over the signal channel of a supervisory control system while the supervisory equipment is at rest.

It is also an object of our invention to provide in a supervisory control system for sequentially telemetering different quantities over the signal channel thereof.

Another object of our invention is to provide in a remote metering system for operating recording means at one station to alternately record different quantities, and to effect operation of transmitting means at a remote station to transmit said different quantities in predetermined timed relation with operation of the recording means.

It is an important object of our invention to provide in a telemetering system for connecting recording means at one station to periodically record different quantities and to transmit a metering signal at the beginning of each period for causing transmitting means at a remote station to sequentially transmit indications of such different quantities in accordance with the order of the recording.

Yet another object of our invention is to provide for continuous telemetering of a plurality of quantities in a predetermined order over the signal channel of a supervisory control system while the system is at rest by using separate sequencing means at each of a control and a remote station for recording and transmitting respectively the quantities in a predetermined timed relation, and for effecting operation of the sequencing means at the remote station in timed relation with that at the control station.

It is a further object of our invention to provide for connecting telemetering means to a signal channel at a control station to record different quantities during predetermined timed intervals, and for transmitting in predetermined timed relation with said intervals a signal for effecting operation of telemetering apparatus at a remote station to transmit signals in accordance with the quantities during said timed intervals.

It is an important object of our invention to provide in a supervisory control system for transmitting a single metering pulse signal to effect transmission from a remote station of a plurality of signals responsive to different quantities to be measured in predetermined timed relation and for operating indicating means in response to such signals to indicate the values of the different quantities in said timed relation.

Other objects will in part be obvious, and will in part be explained hereinafter.

In practicing our invention in one of its embodiments,

2 multiplex telemetering is accomplished over the signal channel of a supervisory control system while the supervisory equipment is in a normal rest condition, by having a telemetering recorder at the dispatching office operated from the supervisory line or receiving relay by a variable duration pulse receiver so as to sequentially record the values of two different quantities during successive timed intervals. The recorder transmits a metering pulse at the beginning of each timed interval, and at a remote station a variable duration pulse transmitter is first connected in response to such metering pulse to send variable duration pulses in accordance with one quantity to be measured and is then reconnected at a predetermined point in each interval to send other variable duration pulses in accordance with another quantity to be measured. During supervisory control operations the receiver is shunted so as to reduce the input to the recorder to zero, and a line is drawn along the edge of the chart opposite such zero reading to indicate that it is not a true zero reading.

For a more complete understanding of the nature and scope of our invention, reference may be had to the following detailed description which may be read in connection with the accompanying drawings, in which:

Figures 1A through 1D taken together provide a schematic diagram of a supervisory control system embodying multiplex telemetering in accordance with our invention;

Figure 2:
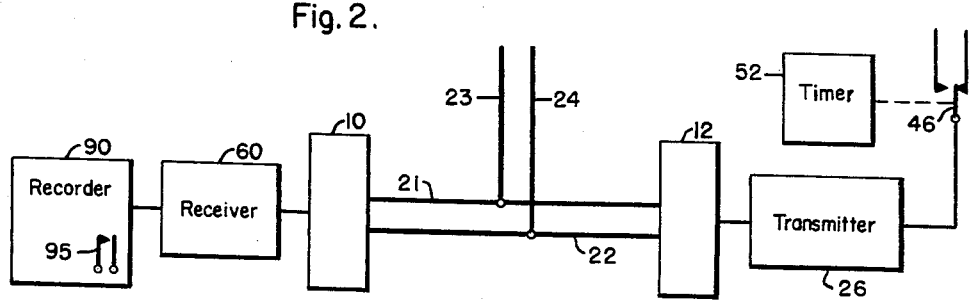
Fig. 2 is a block diagram of the telemetering system shown in Figs. 1A through 1D.

Referring to Figs. 1A through 1D, the reference numerals 10 and 12 denote generally supervisory control equipment including coded impulse sending and receiving means at each dispatching office and a remote station in a supervisory control system of the multi-station type such as is described in detail in Reissue Patent Re. 21,284 which issued on December 5, 1939, to Hans P. Boswau. The equipments 10 and 12 are shown generally in outline form only, since the apparatus included therein is substantially the same as shown in Figs. 1 through 4 and 5 through 7 of the Boswau patent, respectively. All relays of the Boswau patent whose circuitry or function is changed are designated by primed numbers corresponding to the numbers used in the Boswau patent. All relays and circuit connections not illustrated in Figs. 1A and 1D remain the same as shown in the Boswau patent, with the exception of the line transfer arrangement of Boswau, which for purposes of simplification has been omitted, line transfer relays 484, 487 and 494 through 499 at the dispatching office being eliminated, together with the associated transfer keys 218 and 223, and line lamps 217 and 221. Likewise, at the remote station the line transfer relays 582 through 589 and 591 are omitted. Operating key 107 and control key 103 are used in the manner described in the Boswau patent for selection and control of apparatus at one particular point of the plurality of points at a remote station.

Instead of utilizing the line wire circuit of the Boswau patent, carrier frequency transmitters 14 and 16 and carrier frequency receivers 18 and 20 are utilized at the dispatching office and remote station, respectively, for transmitting carrier frequency pulse signals over a signal channel comprising the conductors 21 and 22 of a power system. Conductors 23 and 24 of the power system may be used for the connection of other stations, such as those referred to in the Boswau patent. The line relay 431 of Boswau is presently identified by the numeral 431', since its circuit has been changed to provide for energizing it through an armature *a* of the receiving relay RR of the receiver 18. The line relay 511' at the remote station likewise has its circuit changed so as to be energized through an armature *a* of the receiving relay RR' of the receiver at the remote station. The sending relay 430' at the dispatching office is provided with an armature *a* connected to key the transmitter 14 for transmitting supervisory control signals instead of using the line wire connection of relay 430 in Boswau. Likewise, the sending relay 510' at the remote station is provided with an armature *a* for keying the transmitter 16 at the remote station.

In order to provide for multiplex telemetering of a plurality of quantities, for example, both watts and vars or reactive power from the remote station, telemetering transmitting means 25 comprising a variable duration type pulse transmitter 26 is provided at the remote station. This transmitter may comprise a cam 27 driven by a motor 28 at about one revolution in five seconds for engaging for a variable portion of each revolution a movable contact arm 30 actuated by an induction type disc element 31, which is controlled by windings 32 and 33 energized from current transformers 34 and 35 connected in circuit with the conductors 38 of a three-phase circuit which is to be metered. Associated with the windings 32 and 33 are voltage windings 40 and 41 which may be selectively connected to be energized from the windings 43 and 44 of a potential transformer 45 connected to the conductors 38. A switching relay 46 may be provided for selectively connecting the windings 40 and 41 to the transformer windings 43 and 44 directly to measure watts, and indirectly through a phase shift compensator 48 when it is desired to measure vars. Operation of the switching relay 46 may be effected by a control relay 50, disposed to be energized through a periodic timer 52 having a semicircular conductive segment 53 for energizing a control relay 50 for 30 seconds and then deenergizing it for 30 seconds, whereas in the present instance it is desired to meter only two quantities in succession.

Transmission of a variable duration metering pulse is effected by utilizing to key the transmitter 16 a metering relay 11 which operates from the transmitter 26 under the control of timing relays T1 and T2 in response to receipt of a suitable metering start signal code, such as, for example a single short pulse metering signal from the dispatching office. Thus the timing relay T1 is energized through an armature *a* and a break contact of supervisory control relay 503' which completes a circuit at the end of a code comprising either a single pulse or a plurality of pulses and holds this circuit for a delayed interval after termination of the metering pulse. Also connected in circuit with the timing relay T1 is an armature *b* of the first counting relay 603' which is energized upon the receipt of the first pulse from the dispatching office and deenergized at the termination of a pulse code. An armature *d* and a make contact of sequencing relay 602', which is energized at the termination of the first pulse, it also connected in circuit with relay T1 so as to provide for completing this circuit, only at the termination of the first pulse. The timing relay T2 is energized through armature *b* of relay T1 and is held in the energized position through a holding circuit including its armature *c* and armature *b* of relay 604', which will operate on the receipt of a second pulse to interrupt the holding circuit if more than one pulse is received. Armature *c* of metering relay 11 interrupts the energizing circuit of line relay 511' so that metering pulses cannot operate the supervisory equipment. A time delay relay TD is provided having an armature *b* in shunt with armature *c* of the metering relay 11 so as to provide an operating circuit for the line relay 511', even if the metering relay 11 should somehow fail to become deenergized at the end of a suitable metering interval.

At the dispatching office telemetering receiving means 56 comprising a duration of pulse telemetering receiver 60 is provided, having a motor 61 energized from an alternating current source represented by the conductor 63 to move an adjustable contact 65 of a rheostat 66 in one direction or the other to vary the resistance value thereof under the control of control means 68 disposed to be energized through armature *b* of the line relay 431' for a variable interval, depending on the duration of the metering pulse signals received. The control means 68 is illustrated only generally and may comprise a reverse clutch drive of the type disclosed in the copending application, Serial No. 505,282 of Willard A. Derr, filed May 2, 1955.

The rheostat 66 is connected in an alternating current Wheatstone bridge circuit comprising fixed impedances 70, 71, 72 and a potentiometer 75. The bridge circuit is connected to the conductors 63 by conductors 76 and 77, and to a suitable A.-C. amplifier 80 by conductors 81 and 82, so as to provide, in response to unbalance of the bridge circuit in opposite directions, for reversely energizing one phase winding 84 of a balancing motor 86 having an additional phase winding 88 energized directly from the conductors 63. The motor 86 is operatively connected to the movable contact arm of the potentiometer 75, and operates to rebalance the bridge circuit in response to an unbalance caused by movement of the contact 65. At the same time the motor 86 moves a recording head 89 of a recorder 90 along a shaft 91, so as to adjustably position it relative to a chart 92 for recording thereon the value of the quantity designated by the pulses received by the receiver 60. Thus, the balancing motor 86, recording head 89 and shaft 91 collectively comprise means for indicating the values represented by the telemetered pulse duration signals. The recording head 89 is rotated at a predetermined rate by means of a motor 93 which may also drive the chart 92. The head 89 is provided with printing heads 89*a* and 89*b* adapted to alternately engage the chart 92 and record different indicia thereon, the position of the indicia on the chart from left to right providing an indication in accordance with the value of quantity being measured. The motor 93, the recorder 92, and the printing heads 89*a* and 89*b* comprise means for periodically characterizing the indications as corresponding to different ones of the metered variables at the remote station.

In order to provide for synchronizing operation of the transmitter 26 at the remote station with rotation of the recording head 89, a switch 95 is provided having a contact arm *a* actuated by a cam *b* driven by the shaft 91. Since only two quantities are to be recorded in the present instance, the cam *b* is arranged to close the contract *a* for 30 seconds and then open it for 30 seconds, with the printing head 89*b* being arranged to print on the chart 92 approximately 20 seconds after the contact *a* of the switch 95 closes. Operation of the switch 95 is disposed to effect operation of a metering impulse relay X, which keys the transmitter 14 through armature *b* and make contact to transmit a single pulse for initiating operation of the metering transmitter 26 at the remote station. A cutoff relay Y is energized through armature *c* of relay X to interrupt the energizing circuit for the relay X at armature *b* of the cutoff relay. A control relay Z has an armature *b* connected in series circuit relation with the operating winding of relay X, relay Z being energized to seal itself in through contact *a* of switch 95, so that X can transmit a pulse only at the beginning of a recording cycle.

Inerlocking relays L and M are provided for interrupting the circuit of relay X in the event that a supervisory control operation is commenced. Relay L is energized through armature *d* of relay 302' which operates at the end of the first pulse. In a supervisory code signal, any time a short pulse is either transmitted or received, relay L is connected to indirect positive represented by the plus sign surrounded by a single circle.

This indicates a polarity which is removed during the long or reset of the supervisory control equipment to effect resetting of the supervisory equipment. Relay M is energized through armature *d* of relay L and seals itself in through armature *c* of relay X, so that relay M is not deenergized until relay X operates to transmit the next short metering pulse. Relay M is used to shunt the output of the receiver 60 at armature *c*, so that the recorder will register zero during a supervisory control sending or receiving operation. Armature *d* is connected in circuit with the operating means 68 to interrupt the energizing circuit thereof during a supervisory control operation. In order to indicate that a zero reading obtained during a supervisory operation is not a true zero reading, a pen solenoid 98 is provided for marking a line along the edge of the chart 92 opposite such zero readings, as long as either of relays L or M is energized. Armature *a* of relay X is connected in series with armature *a* of the receiving relay RR and the operating windings of the line relay 431' to prevent operation of the line relay when the relay X transmits the metering pulse.

Whenever the recorder switch 95 closes, a circuit is provided for operating the metering pulse relay X, extending from direct positive through armature *a*, fixed contact *b*, conductor 100, conductor 101, armature *b* and back contact of relay L, conductor 102, armature *b* and back contact of relay Y, conductor 103, back contact and armature *b* of relay Z to the operating windings of relay X. Relay X operates and provides an energizing circuit for relay Y at armature *c*. At the same time armature *b* closes a keying circuit for the transmitter 14. Armature *a* interrupts the energizing circuit for the line relay 431'. Relay Y operates and interrupts the energizing circuit for relay X and armature *b*. A holding circuit for the relay Y is provided at armature *a* through switch 95. Relay X thus causes the transmitter 14 to transmit a metering start signal code comprised of a single pulse which is received at the remote station by the receiver 20 causing operation of the receiving relay RR'.

The line relay 511' is thus operated and effects operation of the first counting relay 603' in the manner described in detail in the Boswau patent. At the termination of this first pulse, sequence relay 602' operates, so that an energizing circuit is provided for the timing relay T1 extending from indirect positive through armature *d* and front contact of sequence relay 602', front contact and armature *b* of the first counting relay 603', back contact and armature of relay 503' which drops at the end of a code of pulses. Relay T1 operates and provides an energizing circuit for relay T2 through armature *b* until relay 503' is deenergized. A holding circuit is established for relay T2 through armature *c* thereof and armature *b* and back contact of the second counting relay 604', which will remain deenergized if only one pulse is received. Relay T2 provides an energizing circuit for the timer 52 through armature *a* so that the timer operates and provides an energizing circuit for the control relay 50 after a 30 second interval. The transmitter 26 is connected to energize the metering relay 11 through armature *b* of relay T2. Relay 11 operates and keys the transmitter 16 for a variable interval through a circuit including armature *a* of the time delay TD. Accordingly, a metering pulse is transmitted by the transmitter, the duration of which is dependent on the position of the movable contact arm 30 which determines the duration of its engagement with the rotating cam contact 27 and may vary in duration up to about 4½ seconds of each 5 second interval.

Operation of the transmitter 16 effects operation of the receiver 18 at the dispatching office, operating the receiving relay RR to effect energization of the line relay 431' for the duration of the metering impulse. The line relay 431' connects the operating means 68 of the receiver 60 to direct positive through armature *b* for the duration of the metering impulse. Accordingly, the movable contact 65, which is reset by the operating means during an off period, will be positioned in accordance with the duration of the metering impulse, thus producing an unbalance in the bridge circuit to effect operation of the balance motor 86 to move the recording head 89 in accordance with the value of the quantity metered by the transmitter 26. At the end of 20 seconds the printing head *b* prints the value of the quantity metered and at the end of 30 seconds the switch 95 opens. At the same time the timer 52 completes an energizing circuit for the control relay 50 which provides through armature *a* an obvious energizing circuit for the vars control relay 46. Relay 46 operates and connects the phase compensator 48 in circuit with the windings 40 and 41 of the transmitter so as to transmit pulses of variable duration in accordance with the vars or reactive energy of the conductors 38. At the end of 20 seconds the printing head *a* of the recorder at the dispatching office engages the chart 92 and prints a recording in accordance with the then position of the recording head 89, which is now determined by the duration of the pulses transmitted by the transmitter 26 with compensator 48 connected in the circuit thereof. The quantity telemetered will continue to be vars until the next single short pulse is received from the dispatching office at the end of the 30 second period, to operate the time delay relay T1 and release control relay 50 by interrupting its holding circuit at armature *a*.

Referring to Fig. 2, it will be seen that a single telemetering transmitter 26 is shown in conjunction with supervisory equipment 12 as selectively connected by means of a timer 52 and switching relay 46 to transmit metering pulses in accordance with the watts and vars of the circuit conductors 38, while at the dispatching office a receiver 60 is shown in conjunction with the supervisory equipment 10 as operating a recorder 90 having a timing switch 95 to periodically record these different quantities.

Figure 3:
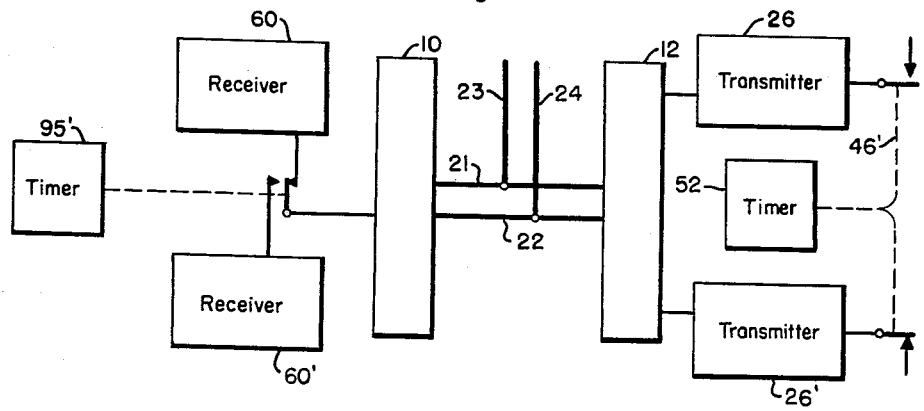
Fig. 3 is a block diagram of a telemetering system embodying the invention in a different form.

In accordance with the embodiment shown in Fig. 3, a timer 95' is utilized to connect different receivers 60 operating in conjunction with supervisory equipment 10, to the signal channel in predetermined timed relation for responding to metering pulses transmitted by transmitters 26 and 26' operating in conjunction with supervisory equipment 12, and which are periodically connected to the signal channel by means of a timer 52 controlled by a metering code initiated by the timer 95' in a manner similar to that described in connection with the system of Figs. 1A through 1D.

Figure 4:
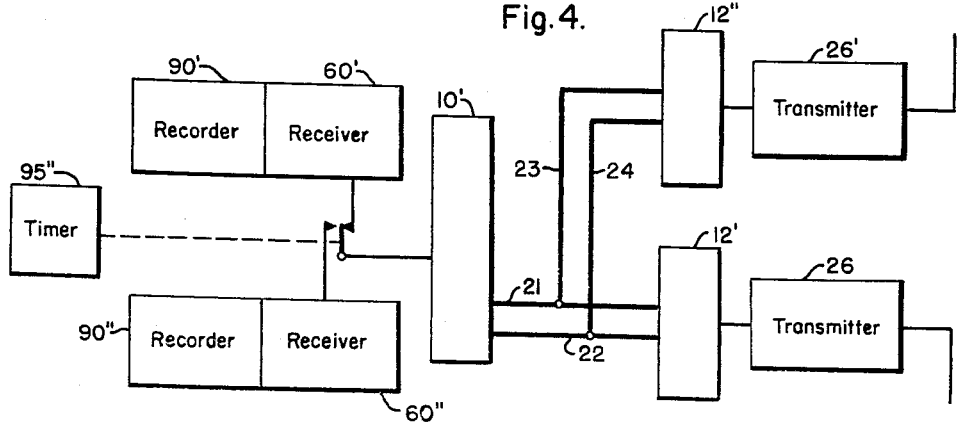
Fig. 4 is a block diagram of a telemetering system embodying the invention in yet another of its forms.

In yet another embodiment of the invention, as shown in Fig. 4, a timer 95" is utilized at one station having supervisory control equipment 10' to periodically connect combined recorders 90' and 90" and associated receivers 60' and 60" to the signaling channel conductors 21 and 22 and transmit different metering codes for selectively connecting, in predetermined timed relation, transmitters 26 and 26' to the signaling channel in conjunction with supervisory equipments 12' and 12" at different stations along the channel for telemetering different quantities.

From the above description and the accompanying drawings, it will be apparent that we have provided in a simple and effective manner for multiplex telemetering over a single signal channel while the supervisory equipment is normally at rest. While the system has been shown as applied to a signal channel which utilizes a carrier frequency medium, it will be realized that it may be also used with a line wire system such as shown in the Boswau patent. While the invention has been illustrated as applied to a system in which only two quantities are being metered, it will be realized that any plurality of quantities may be successively metered in predetermined timed relation in accordance with the embodiments of the invention. A telemetering system embodying the features of our invention provides for maximum utilization of the signal channel with a minimum of interference with supervisory and control operations. Since a metering impulse occupies a maximum of approximately 4½ seconds of a 5-second metering period, adequate off-metering time is provided for permitting supervisory and control operations to take preference, so that a minimum of interference with the supervisory control operations is caused.

Since certain changes may be made in the above described construction and different embodiments of the invention may be made without departing from the spirit and scope thereof, it is intended that all the matter contained in the above description and shown in the accompanying drawings shall be considered as illustrative and not in a limiting sense.

We claim as our invention:

1. In a control system having a signal channel connecting a dispatch office and a remote station, a plurality of control points at the remote station, metering transmitting means as the remote station operable in response to a start signal to transmit metering signals in predetermined time sequence in accordance with the values of each of a plurality of different variable quantities, control apparatus at the dispatch office for sending control signal codes over the signal channel, receiving apparatus at the remote station responsive to each of said control signal codes over the signal channel to select for operation one of said control points and including means responsive to a metering start signal code over the signal channel to select the metering transmitting means for sending metering signals over the signal channel, said control and receiving apparatus including means operable to reset the control and receiving apparatus at the completion of each control point selection operation, metering receiving means at the dispatch office including means for indicating the metering values; means characterizing the indications in predetermined time sequence as corresponding to the different variables in the order of sequence of transmission by the metering transmitting means; normally inoperable means for providing the metering start signal at the beginning of a characterization of an indication as corresponding to a predetermined one of said variable quantities, means at the dispatch office responsive to said reset operation to render operable said normally inoperable means and including means for conditioning the metering receiving means to respond to the metering signals transmitted over the signal channel, and means rendering inoperable the metering receiving means and the metering transmitting means during each control point selection operation.

2. In a control system having a signal channel connecting a dispatch office and a remote station, a plurality of control points at the remote station, metering transmitting means at the remote station for sending metering signals over the signal channel in accordance with a plurality of variable quantities, control apparatus at the dispatch office for sending control signal codes over the signal channel, receiving apparatus at the remote station responsive to each of said control signal codes over the signal channel to select for operation one of said control points and including means responsive to a metering start signal code over the signal channel to select the metering transmitting means for sending metering signals over the signal channel, said control and receiving apparatus including means operable to reset the control and receiving apparatus at the completion of each control point selection operation, metering receiving means at the dispatch office, means at the dispatch office responsive to said reset operation to send said metering start signal code over said signal channel and including means for conditioning the metering receiving means to respond to the metering signals transmitted over the signal channel, and means rendering inoperable the metering receiving means and the metering transmitting means during each control point selection operation.

3. In a control system having a signal channel connecting a dispatch office and a remote station, a plurality of control points at the remote station, metering transmitting means at the remote station operable to transmit metering signals over the signal channel in accordance with values of a plurality of different variable quantities, timing means operable to connect the transmitting means to each variable quantity in predetermined sequence for definite periods in response to a metering start signal code, control apparatus at the dispatch office for selectively sending control signal codes over the signal channel, receiving apparatus at the remote station responsive to each of said control signals over the signal channel to select for operation one of said control points and including means responsive to the metering start signal code to select the metering transmitting means for sending the metering signals over the signal channel, said control apparatus and receiving apparatus including means operable to reset the control and receiving apparatus at the completion of each control point selection operation, metering receiving means at the dispatch office to be operated by the metering signals over the signal channel, means responsive to the operation of the metering receiving means to indicate the telemetering values; means for characterizing the indications as corresponding to each of the variable quantities in predetermined sequence and for periods corresponding to the periods in the sequence of the metering transmitting means, means for providing the metering start signal code at the beginning of a predetermined one of said characterizing periods, means responsive to said reset operation to connect said metering start signal code means to control the signal channel and including means for conditioning the metering receiving means to respond to the metering signals transmitted over the signal channel, and means rendering inoperable the metering receiving means and the metering transmitting means during a control operation.

4. In a control system having a signal channel connecting a dispatch office and a remote station, a plurality of control points at the remote station, metering transmitting means at the remote station operable to transmit metering signals over the signal channel in accordance with values of a plurality of different variable quantities, timing means operable to connect the transmitting means to each variable quantity in predetermined sequence for definite periods in response to a metering start signal code, control apparatus at the dispatch office for selectively sending control signal codes over the signal channel and including means operable to count the signals in each code, receiving apparatus at the remote station responsive to each of said control signals over the signal channel to select for operation one of said control points and including means operable to count the signals in each code and including means responsive to the metering start signal code to select the metering transmitting means for sending the metering signals over the signal channel, said control apparatus and receiving apparatus including means operable to reset the control and receiving apparatus at the completion of each selection operation, metering receiving means at the dispatch office to be operated by the metering signals over the signal channel, means responsive to operation of the metering receiving means to indicate the telemetering values and including means for characterizing the indication as corresponding to each of the variable quantities in predetermined sequence and for periods corresponding to the periods in the sequence of the metering transmitting means, means for providing the metering start signal code at the beginning of a pretermined one of said characterizing periods, means responsive to said reset operation to connect said metering start signal code means to control the signal channel and including means for conditioning the metering receiving means to respond to the metering signals transmitted over the signal channel, means responsive to operation of the sending counting means in counting the signals of a control code to render inoperable the metering receiving means, and means responsive to operation of the receiving counting means in counting the signals of a control code to render the metering transmitting means inoperable.

References Cited in the file of this patent

UNITED STATES PATENTS

| | | |
|---|---|---|
| 2,145,026 | Huxford | Jan. 24, 1939 |
| 2,207,743 | Larson | July 16, 1940 |
| 2,327,251 | Derr | Aug. 17, 1943 |
| 2,484,208 | Derr | Oct. 11, 1949 |
| 2,550,109 | Derr | Apr. 24, 1951 |
| 2,586,427 | Hagenau | Feb. 19, 1952 |
| 2,597,075 | Derr | May 20, 1952 |
| 2,644,931 | Derr | July 7, 1953 |
| 2,660,509 | Rusch | Nov. 24, 1953 |

OTHER REFERENCES

Book by Borden et al., Principles and Methods of Telemetering, Reinhold Publishing Corp., 1948 (page 149 relied on).